(12) United States Patent
Heuler

(10) Patent No.: US 7,726,122 B2
(45) Date of Patent: Jun. 1, 2010

(54) HYDRODYNAMIC TORQUE CONVERTER

(75) Inventor: Michael Heuler, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 278 days.

(21) Appl. No.: 11/974,228

(22) Filed: Oct. 12, 2007

(65) Prior Publication Data

US 2008/0087514 A1    Apr. 17, 2008

(30) Foreign Application Priority Data

Oct. 17, 2006  (DE)  ........................ 10 2006 048 914

(51) Int. Cl.
    *F16D 33/18*    (2006.01)
(52) U.S. Cl. .......................... 60/330; 60/358
(58) Field of Classification Search .................. 60/330, 60/358, 364–366; 192/206
    See application file for complete search history.

(56) References Cited

U.S. PATENT DOCUMENTS 2,034,429 A * 3/1936 De Lavaud ................... 60/358

FOREIGN PATENT DOCUMENTS

DE    199 08 123    8/2000

* cited by examiner

*Primary Examiner*—F. Daniel Lopez
(74) *Attorney, Agent, or Firm*—Cohen Pontani Lieberman & Pavane LLP

(57) ABSTRACT

A hydrodynamic torque converter including a housing connectable to a drive element for rotation in common around an axis of rotation, the housing being fillable with a fluid; a pump wheel in the housing; a turbine wheel in the housing and connected to a takeoff element; and a supporting/sealing hub area on an axial side of the housing and facing away from the drive element, the supporting/sealing hub area comprising a first hub element permanently connected to the housing; and a second hub element connected to the first hub element for rotation in common around the axis of rotation, the second hub element being axially movable relative to the first hub element, the second hub element comprising an outside circumference, a sealing surface on the outside circumference, a first axial end facing away from the drive element, and a rotational driver formation at the first axial end.

13 Claims, 2 Drawing Sheets

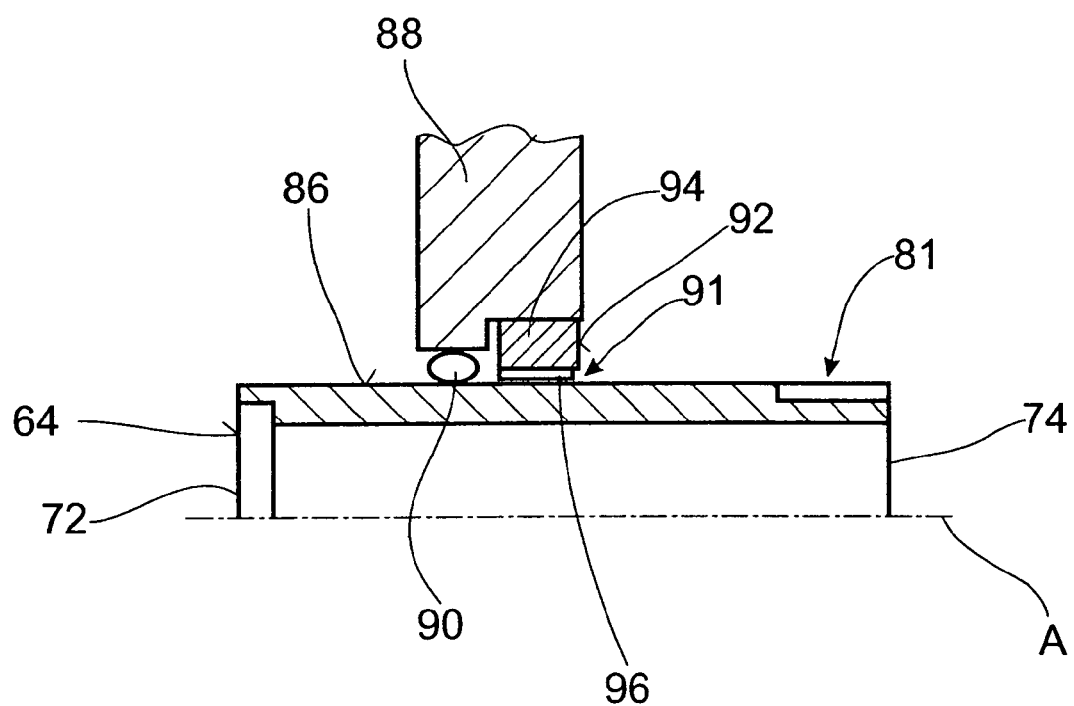

HYDRODYNAMIC TORQUE CONVERTER

BACKGROUND OF THE INVENTION

1. Field of the Invention

The present invention relates to a hydrodynamic torque converter, comprising a housing arrangement, which is or can be filled with fluid, and which is to be connected by a connecting area to a drive element for rotation in common around an axis of rotation; a pump wheel; and a turbine wheel, which is to be connected to a takeoff element in the housing arrangement. A supporting/sealing hub area is provided on the axial side of the housing arrangement facing away from the connecting area.

2. Description of the Related Art

A hydrodynamic torque converter of this type is known from DE 199 08 123 A1. The hydrodynamic torque converter, which is to be connected on the drive side to the crankshaft of an internal combustion engine and to be connected on the takeoff side via the turbine wheel to a gearbox input shaft, has, on the axial side facing the gearbox, an essentially sleeve-like or hollow shaft-like hub, which is intended to fulfill various functions. This hub is attached at one axial end by welding to the radially inner end of the housing arrangement, and at its other axial end, which, in the assembled state of a drive train, is located inside a gearbox housing; the hub has a rotational driver formation, which, during rotational operation, drives an oil pump located inside the gearbox housing, so that oil, as the working fluid, can be transported into the interior of the housing arrangement. Between the two axial ends of this hub, the outside circumference forms a sealing surface, on which a sealing arrangement acts to establish a fluid-tight connection with respect to the gearbox housing. The end surface at the axial end of this hub which is connected to the radially inner area of the housing arrangement forms a bearing surface or support surface for a bearing, which axially supports a stator located inside the housing arrangement. This hub, furthermore, is mounted or supported on its inside surface with respect to a support shaft by another support arrangement. The support shaft carries the previously mentioned stator but is fixed in position on the gearbox housing and thus does not rotate along with the other components during rotational operation.

Various problems arise as a result of this integration of a large number of different functions in a single component. For example, slight displacements of the gearbox housing with respect to the hydrodynamic torque converter can lead to damage to the sealing arrangement which rests on the sealing surface of the hub, because this hub projects into the gearbox housing more-or-less freely, that is, without additional support. In addition, because of the various functions which it must fulfill, the hub must be manufactured with a high degree of precision and must also be subjected to expensive grinding and deburring operations especially so that the sealing arrangement, usually designed as a sealing ring which rests on the sealing surface, can be installed properly. This also applies to the axial end surface which provides the bearing surface for the axial bearing which supports the stator.

SUMMARY OF THE INVENTION

An object of the present invention is to provide a hydrodynamic torque converter that can be manufactured more easily than the prior art torque converters and, at the same time avoids problems of the prior art torque converter with the interaction between the supporting/driving hub arrangement and the other system components.

According to the invention, this object is achieved by a hydrodynamic torque converter comprising a housing arrangement, which is or can be filled with fluid, and which is to be connected by a connecting area to a drive element for rotation in common around an axis of rotation; a pump wheel; and a turbine wheel, which is to be connected to a takeoff element in the housing arrangement. A supporting/sealing hub area is provided on the axial side of the housing arrangement facing away from the connecting area. The supporting/sealing hub area comprises a first hub element, permanently connected to the housing arrangement, and a second hub element, which is connected essentially for rotation in common to the first hub element but which is free to move in the axial direction with respect to it. The outside circumference of the second hub element provides a sealing surface and has a rotational driver formation at the axial end facing away from the housing arrangement.

In the case of the inventive hydrodynamic torque converter, therefore, the hub arrangement is divided, so that each of the two hub elements takes over some of the functions to be fulfilled. Each of the hub elements can therefore be made or machined by itself, even before assembly, in such a way that that it can fulfill its functions in optimal fashion without causing any negative effects on the other hub element.

To obtain a design which is especially compact in the axial direction, it is proposed that the first hub element and the second hub element be designed as sleeve-like parts and that the second hub element surround the first hub element radially on the outside. To ensure that no fluid leakage can occur in the transition area between the two hub elements, it is proposed that a sealing arrangement be provided to produce a fluid-tight closure between the first hub element and the second hub element. For this purpose, it is possible, for example, for the sealing arrangement to comprise a sealing ring located between an inside surface of the second hub element and an outside surface of the first hub element.

So that the two hub elements can assume defined positions with respect to each other, it is proposed that the second hub element be spring-loaded with respect to the first hub element in the direction facing away from the housing arrangement. For example, a loading spring supported against the housing arrangement can exert force on the second hub element.

The first hub element and the second hub element can be connected for rotation in common while still having freedom of axial movement by means of a rotational connecting arrangement. This rotational connecting arrangement can comprise positively engaging projection/depression formations on the first hub element and on the second hub element.

So that the second hub element can interact with, for example, an oil pump inside a gearbox, i.e., the pump which the second hub element is intended to drive, it is proposed that the sealing surface on the second hub element be located between the axial end of the second hub element facing the housing arrangement and the rotational driver formation.

The first hub element can be permanently connected to a pump wheel outer shell of the housing arrangement by welding.

According to another advantageous aspect, the second hub element can provide a bearing surface for the support of the hydrodynamic torque converter. It is also advantageous here for the bearing surface to be located between the sealing surface and the rotational driver formation.

Because the principles of the present invention can be applied in an especially advantageous manner but not exclusively in conjunction with a hydrodynamic torque converter and can thus be applied to any torque-transmitting/converting unit in which a hub area of this type is provided especially for cooperation with a fluid pump, the present invention also pertains to a supporting/sealing hub area for a housing of a hydrodynamic torque converter, of a clutch, of a wet-running plate clutch, or the like, comprising a first element to be permanently connected to the housing arrangement and a second hub element, which is connected essentially nonrotatably to the first hub element but which is free to move in the axial direction with respect to it. The second hub element provides a sealing surface on its outside circumference and has a rotational driver formation at the axial end to be positioned facing away from the housing arrangement.

It is also possible for the second hub element to have a bearing surface on its outside circumference between the sealing surface and the rotational driver formation.

So that the loads occurring in the support area can be withstood, it is also proposed that the second hub element be hardened, at least in the area of its bearing surface.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is described in detail in the following with reference to the attached drawings:

FIG. 2 shows a view, in isolation, of a modified design of the supporting/sealing area.

DETAILED DESCRIPTION OF THE PRESENTLY PREFERRED EMBODIMENTS

Figure 1:
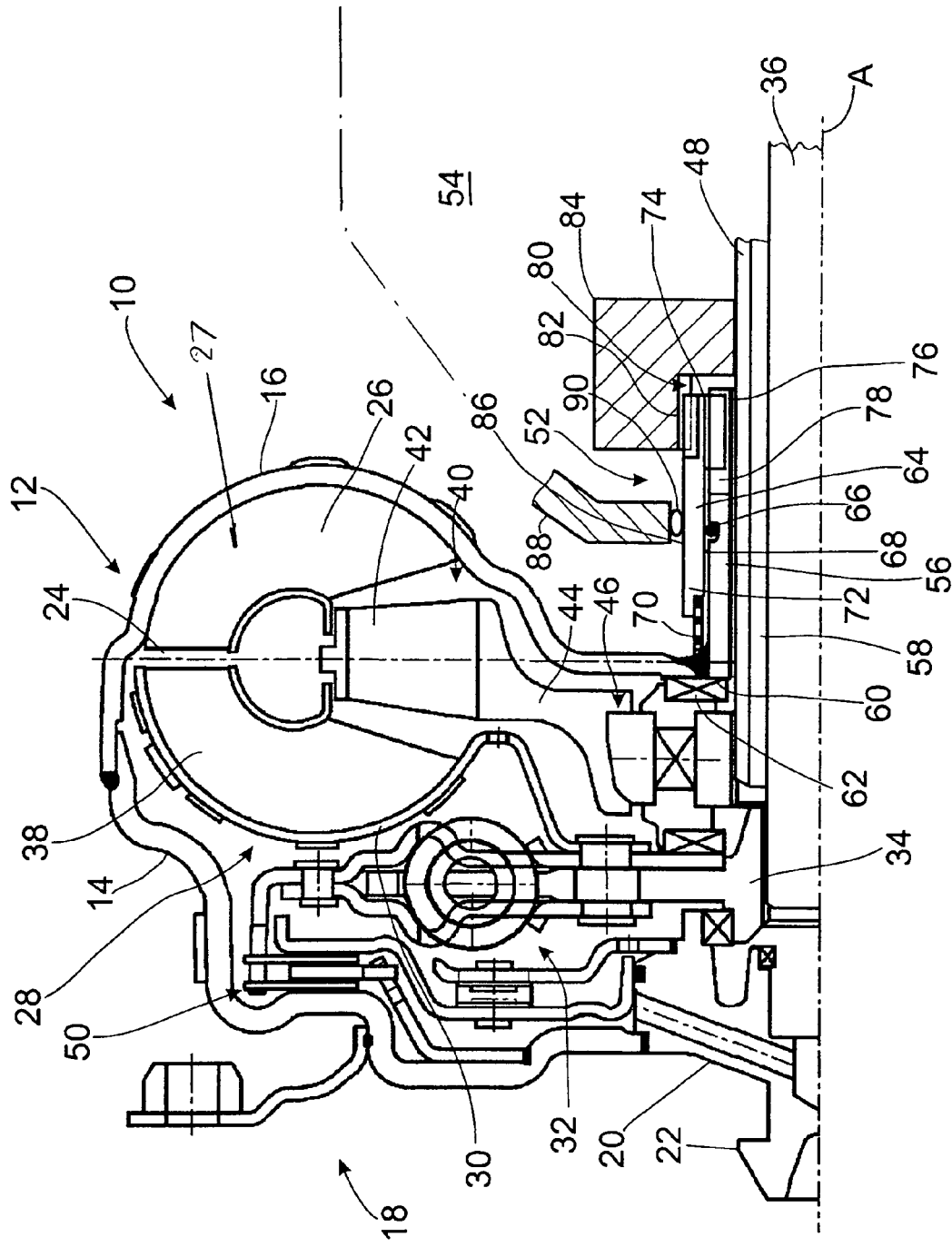
FIG. 1 shows a partial longitudinal cross section through a hydrodynamic torque converter designed in accordance with the principles of the present invention.

The hydrodynamic torque converter 10 comprises a housing arrangement 12, which can be divided essentially into a housing shell 14 on the engine side and a housing shell 16 on the gearbox side. A connecting area 18 is provided on the engine-side housing shell 14 so that the hydrodynamic torque converter 10 can be connected to, and driven by, a drive component such as the crankshaft of an internal combustion engine by way of, for example, a flexplate or the like and in this way can be driven in rotation around the axis of rotation A. At the radially inner end, the engine-side housing shell 14 is permanently connected by means of welding, for example, to a housing hub 20, which can be radially supported by way of a bearing journal 22 in an opening in the drive component.

The gearbox-side housing shell 16 forms a pump wheel outer shell and carries on its radially outer area, on the side facing the interior 24 of the housing, a plurality of pump wheel vanes 26, which are arranged in a row in the circumferential direction around the axis of rotation A and thus provide a pump wheel 27. In the interior 24 of the housing, a turbine wheel 28 is arranged opposite the engine-side housing shell 16, that is, the pump wheel outer shell. This turbine wheel 28 comprises a turbine wheel outer shell 30, which, for example, is connected for rotation in common by way of a torsional vibration damper arrangement 32 to a turbine wheel hub 34. This turbine wheel hub 34, when in the assembled state of a drive train, is engaged for rotation in common with a gearbox input shaft 36. Turbine wheel vanes 38 are carried on the turbine wheel outer shell 30, opposite the pump wheel vanes 26. A stator 40 is arranged axially between the turbine wheel 28 and the gearbox-side housing shell 16. Stator vanes 42 are located between the radially inner end areas of the pump wheel vanes 26 and the turbine wheel vanes 38 and are carried by way of a stator ring 44 and a freewheel arrangement 46, which blocks rotation in one direction, on a support shaft 48, which is designed as a hollow shaft. The hydrodynamic torque converter 10, furthermore, has a bridging clutch 50, by means of which torque can be transmitted directly between the housing arrangement 12 and the turbine wheel hub 34 and thus to the gearbox input shaft 36, bypassing the hydrodynamic circuit formed by the pump wheel vanes 26, the turbine wheel vanes 28, and the stator vanes 42.

It should be pointed out here that, to the extent that the previously described design of the hydrodynamic torque converter 10 is concerned, it is to be considered only one example of a large number of possible design embodiments. For the present invention, it is important that this hydrodynamic torque converter 10 has a housing arrangement 12 which is to be connected on the side facing a drive unit to this drive unit for rotation in common, whereas it interacts on the other side with a gearbox 54 (indicated only schematically) by way of a supporting/driving hub area 52 to be described further below.

This supporting/driving hub area 52 comprises a first sleeve-like or hollow shaft-like hub element 56, which, at the end 58 near the housing arrangement 12, i.e. the gearbox-side housing shell 16, is permanently connected to this housing shell 16 by welding, for example. The radially inner end area of the gearbox-side housing shell 16, i.e., the pump wheel outer shell, cooperates with the end surface of the first hub element 56 to provide a bearing surface 60 for a bearing 62, which axially supports the stator 40.

A second sleeve-like or hollow shaft-like hub element 64 surrounds the first hub element 56 and is basically free to shift position in a direction parallel to the axis of rotation A with respect to the first hub element 56. To obtain a fluid-tight closure between these two hub elements 56, 64, a sealing element 66, designed as an O-ring, for example, is installed in an outer circumferential groove in the first hub element 56. The sealing element 66 rests against an inside circumferential surface 68 of the second hub element 64 and thus produces a leak-tight seal. This leak-proof closure or the design of the sealing element 66 is such that the two hub elements 56, 64 can shift position with respect to each other in the direction parallel to the axis of rotation A.

A compression spring 70 is supported at one axial end against the outside surface of the housing arrangement 12 and at its other axial end is supported against the end 72 of the second hub element 64 facing the housing arrangement 12. So that the compression spring 70 can be centered, the inside circumference of the second hub element 64 can be provided with a series of step-like expansions at this end 72.

At the end 74 facing away from the housing arrangement 12, the second hub element 64 is engaged for rotation in common with the first hub element 56, i.e., with the recesses or depressions 78 formed in it, by means of radially inward-pointing projections 76. This engagement is designed in such a way that the two hub elements 56, 64 can shift position axially with respect to each other but can execute essentially no rotational movement with respect to each other. For this purpose, the depressions 78 can be longer in the axial direction, for example, than the projections 76.

At the axial end 74, furthermore, the second hub element 64 is designed with a rotational driver formation 80 in the form of, for example, several gear tooth-like projections or depressions, which are engaged or can be engaged for rotation in common with a corresponding rotational driver formation 82 on an oil pump 84, shown only schematically. Because of the axial loading of the second hub element 64 in the direction away from the housing arrangement 12 and thus in the direction toward the gearbox 54 and the oil pump 80, it is ensured not only that axial tolerances can be compensated when the drive train is assembled but also that a reliable engagement between the two driver formations 80, 82 will be realized at the same time. The rotational driver formation 82 on the oil pump 84 or some other type of stop formed inside the gearbox 54 can also serve to limit the axial travel of the second hub element 64. Axial travel limitation of this type could also, however, be provided on the first hub element 56, so that the two hub elements 56, 64 will be held in defined positions with respect to each other even before the drive train is assembled.

A sealing surface 86 is formed on the outside circumference of the second hub element 64 between the two axial ends 72, 74. A sealing element 90, such as a radial packing ring or the like, acting between a gearbox housing 88 and this sealing surface 86, guarantees that the gearbox housing 88 will be closed off in a fluid-tight manner at the transition to the supporting/driving hub area 52, where at the same time the necessary freedom of relative rotation is provided as well.

Several advantages are obtained by dividing the hub arrangement 52 into two hub parts 56, 64. For example, because of the ability of the two hub elements 56, 64 to move with respect to each other, housing displacements between the hydrodynamic torque converter 10 and the gearbox 54 can be compensated both in the axial direction and also to a small extent in the radial direction. The axial dimension in particular of the various functional areas can be reduced. The two hub elements 56, 64 can be provided or purchased at low cost as prefabricated parts, and because the first hub element 56 is to be welded to the housing shell 16, no effects which might affect the precision of the sealing surface 86 on the second hub element 64 are produced. In particular, it is not necessary to subject the second hub element 64 to a precision finishing treatment such as deburring before the sealing element 90 is installed on it.

In a variation, it is possible to integrate the second hub element 64 into the gearbox 54 and to combine it right at beginning with the oil pump 84 to form a structural unit. The two hub elements 64 and 56 will then simply be pushed into each other when the drive train is being assembled. In this design variant, the hub element 64 can then be supported in both axial directions in the gearbox 54, so that there is no need to provide the spring 70.

FIG. 2 shows a modification. Here, too, we can see the second hub element 64, which again is tightly sealed off against the gearbox housing 88 by the sealing element 90. Axially between the sealing surface 86 and the rotational driver formation 80, a bearing surface 91 is formed on the second hub element 64. In the area of this bearing surface 91, the second hub element 64 and thus the entire hydrodynamic torque converter are supported by a roller bearing 92 with respect to a stationary assembly such as, again, the gearbox housing 88. This roller bearing 92 can be designed as a needle bearing, for example, which has an outer ring 94 with a plurality of elongated, needle-like rolling elements 96. The needle bearing 92, however, does not have an inner bearing ring. The bearing surface 91 of the second hub element 64 provides this function.

In this embodiment, therefore, the functionality of support, i.e., of radial support, is also incorporated into the second hub element 64. Here is where the advantage of the two-part design of the hub arrangement 52 becomes especially clear. Because of the presence of the bearing surface 91, the second hub element 64 is subjected to extreme loads especially in this area, so that it is advantageous for this area to be made of very hard special material and/or to harden it even more by induction hardening. The first hub element 56 does not have to be subjected to these measures, because it is not subjected to such severe loads. As a result of the two-part design of the hub arrangement 52, it is ensured simultaneously that, when the first hub element 56 is welded to the housing arrangement 12, no disadvantageous effects are created on the dimensional accuracy of the second hub element 64. Each of the hub elements 64 and 56 can therefore be made out of the material most suitable for the purpose and fabricated by the necessary or most suitable machining processes. In particular, it is possible for the first hub element 56 to be made of a highly weldable material, which is usually not hardened to a high degree, and in the case of the present invention it does not have to be highly hardened.

It is obvious that the principles of the present invention, that is, the multi-part design of the hub arrangement, can unfold their advantageous effects not only in the case of a hydrodynamic torque converter but also in any similarly constructed assembly such as a fluid clutch. This, too, comprises a housing arrangement with a pump wheel and a turbine wheel, where an oil pump in a gearbox is to be driven by this housing arrangement or by the hub arrangement provided on it.

Wet-running plate clutches also have these types of housing arrangements, which, at the end facing the gearbox, are supported and/or sealed with respect to the gearbox by a hub arrangement and which cooperate with a fluid pump in the gearbox. A wet-running plate clutch of this type has no pump wheel or turbine wheel inside. Instead, it has stacks of plates which can be brought into frictional engagement with each other. Nevertheless, the same requirement exists with respect to the support of the housing arrangement as previously described in reference to a hydrodynamic torque converter.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A hydrodynamic torque converter comprising:
a housing connectable to a drive element for rotation in common around an axis of rotation, the housing being fillable with a fluid;
a pump wheel in the housing;
a turbine wheel in the housing and connected to a takeoff element; and
a supporting/sealing hub area on an axial side of the housing and facing away from the drive element, the supporting/sealing hub area comprising:

a first hub element permanently connected to the housing; and a second hub element connected to the first hub element for rotation in common around the axis of rotation, the second hub element being axially movable relative to the first hub element, the second hub element comprising an outside circumference, a sealing surface on the outside circumference, a first axial end facing away from the drive element, and a rotational driver formation at the first axial end, wherein each of the first hub element and the second hub element is sleeve-shaped, the second hub element radially surrounding the first hub element.

2. The hydrodynamic torque converter of claim 1, further comprising a sealing arrangement producing a fluid-tight closure between the first hub element and the second hub element.

3. The hydrodynamic torque converter of claim 2, wherein the sealing arrangement comprises a sealing ring disposed between the first hub element and the second hub element.

4. The hydrodynamic torque converter of claim 1, wherein the second hub element further comprises a second axial end facing the drive element, the sealing surface being disposed between the second axial end and the rotational driver formation.

5. The hydrodynamic torque converter of claim 1, wherein the second hub element provides a bearing surface for support of the hydrodynamic torque converter.

6. The hydrodynamic torque converter of claim 5, wherein the bearing surface is axially disposed between a sealing element and the rotational driver formation.

7. A hydrodynamic torque converter comprising:

a housing connectable to a drive element for rotation in common around an axis of rotation, the housing being fillable with a fluid;

a pump wheel in the housing;

a turbine wheel in the housing and connected to a takeoff element; and a supporting/sealing hub area on an axial side of the housing and facing away from the drive element, the supporting/sealing hub area comprising:

a first hub element permanently connected to the housing; and a second hub element connected to the first hub element for rotation in common around the axis of rotation, the second hub element being axially movable relative to the first hub element, the second hub element comprising an outside circumference, a sealing surface on the outside circumference, a first axial end facing away from the drive element, and a rotational driver formation at the first axial end, wherein the second hub element is spring-loaded relative to the first hub element in a direction away from the housing.

8. The hydrodynamic torque converter of claim 7, further comprising a loading spring which is supported on the housing and loads the second hub element relative to the first hub element.

9. The hydrodynamic torque converter of claim 8 wherein the first hub element and the second hub element are connected to each other for rotation in common by a rotational connecting arrangement.

10. The hydrodynamic torque converter of claim 9, wherein the rotational connecting arrangement comprises one of a projection formation and a depression formation on one of the first hub element and the second hub element, and the other of a projection formation and a depression formation on the other of the first hub element and the second hub element.

11. A hydrodynamic torque converter comprising:

a housing connectable to a drive element for rotation in common around an axis of rotation, the housing being fillable with a fluid;

a pump wheel in the housing;

a turbine wheel in the housing and connected to a takeoff element; and a supporting/sealing hub area on an axial side of the housing and facing away from the drive element, the supporting/sealing hub area comprising:

a first hub element permanently connected to the housing; and a second hub element connected to the first hub element for rotation in common around the axis of rotation, the second hub element being axially movable relative to the first hub element, the second hub element comprising an outside circumference, a sealing surface on the outside circumference, a first axial end facing away from the drive element, and a rotational driver formation at the first axial end, wherein the housing comprises a pump wheel outer shell, the first hub element being welded to the pump wheel outer shell.

12. A supporting/sealing hub area for a housing of one of a hydrodynamic torque converter, a clutch and a wet-running plate clutch, the supporting/sealing hub area comprising:

a first hub element permanently connectable to the housing; and a second hub element non-rotatably connectable to the first hub element, the second hub element being axially movable relative to the first hub element, the second hub element comprising an outside circumference, a sealing surface on the outside circumference, a first axial end facing away from the housing, and a rotational driver formation at the first axial end, wherein the second hub element further comprises a bearing surface which is on the outside circumference and axially disposed between a sealing element and the rotational driver formation.

13. The supporting/sealing hub area of claim 12, wherein at least the bearing surface of the second hub element is hardened.

* * * * *